(12) United States Patent
Iwai

(10) Patent No.: US 12,292,659 B2
(45) Date of Patent: May 6, 2025

(54) MOUNTING STRUCTURE FOR TRANSPARENT LIQUID CRYSTAL DISPLAY DEVICE

(71) Applicant: Japan Display Inc., Tokyo (JP)

(72) Inventor: Youhei Iwai, Tokyo (JP)

(73) Assignee: Japan Display Inc., Tokyo (JP)

( * ) Notice: Subject to any disclaimer, the term of this patent is extended or adjusted under 35 U.S.C. 154(b) by 122 days.

(21) Appl. No.: 18/472,300

(22) Filed: Sep. 22, 2023

(65) Prior Publication Data

US 2024/0103326 A1    Mar. 28, 2024

(30) Foreign Application Priority Data

Sep. 27, 2022   (JP) ................. 2022-153179

(51) Int. Cl.
| | | |
|---|---|---|
| G02F 1/1345 | (2006.01) | |
| G02F 1/1333 | (2006.01) | |
| G02F 1/1334 | (2006.01) | |
| G02F 1/1335 | (2006.01) | |
| G02F 1/13357 | (2006.01) | |
| G02F 1/1339 | (2006.01) | |

(52) U.S. Cl.
CPC .... *G02F 1/13452* (2013.01); *G02F 1/133331* (2021.01); *G02F 1/133382* (2013.01); *G02F 1/133615* (2013.01); *G02F 1/133628* (2021.01); *G02F 1/13398* (2021.01); *G02F 1/133385* (2013.01); *G02F 1/1334* (2013.01)

(58) Field of Classification Search
CPC ......... G02F 1/133385; G02F 1/133628; G02F 1/13452; G02F 1/1334; G02F 1/133615
See application file for complete search history.

(56) References Cited

U.S. PATENT DOCUMENTS

| | | | |
|---|---|---|---|
| 2021/0364849 A1 | 11/2021 | Kanesaka | |
| 2021/0382363 A1* | 12/2021 | Iwai | ................. G02F 1/136286 |
| 2022/0283462 A1 | 9/2022 | Ohue | |
| 2022/0299807 A1 | 9/2022 | Ohue | |

FOREIGN PATENT DOCUMENTS

| | | | | |
|---|---|---|---|---|
| JP | 2004071298 A | * | 3/2004 | |
| JP | 2021-092702 A | | 6/2021 | |
| JP | 2021-092748 A | | 6/2021 | |
| JP | 2021-184052 A | | 12/2021 | |
| WO | WO-2020213415 A1 | * | 10/2020 | ....... G02F 1/136286 |

* cited by examiner

*Primary Examiner* — Alexander P Gross
(74) *Attorney, Agent, or Firm* — Michael Best & Friedrich LLP

(57) ABSTRACT

Provided is a mounting structure for a transparent liquid crystal display device that is placed in a glass window in which a periphery of a first glass plate is accommodated in and held by a first frame member. In the mounting structure, the transparent liquid crystal display device is affixed to the first glass plate by a transparent adhesive sheet and has a display region and a terminal region. The terminal region is accommodated in the first frame member, and a light source including an LED and a driver IC are placed in the terminal region. A heat conduction sheet is placed between the light source and the driver IC on one hand and the first frame member on the other hand and is acted upon by pressure by which the heat conduction sheet is pressed against the light source and the driver IC.

20 Claims, 17 Drawing Sheets

F I G . 1 7
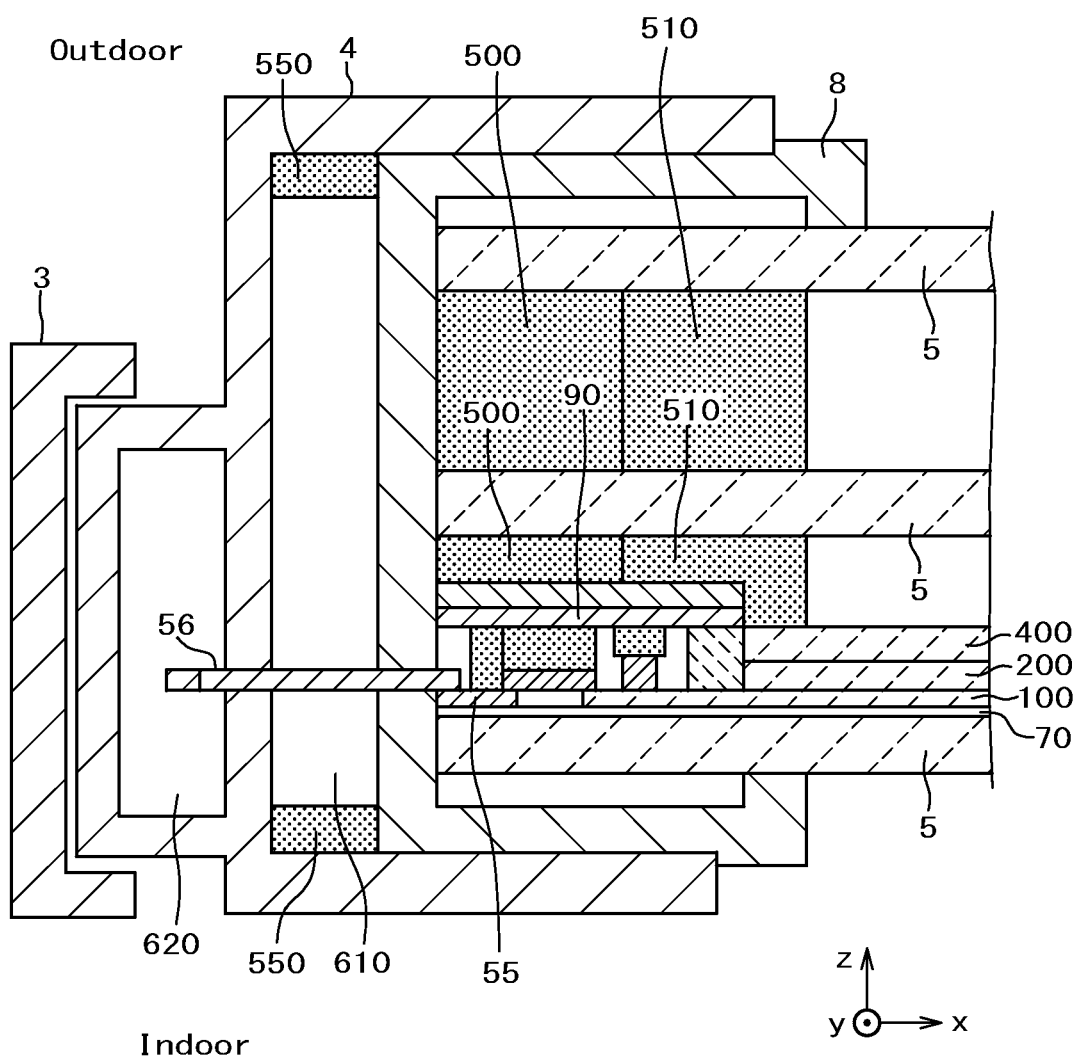

MOUNTING STRUCTURE FOR TRANSPARENT LIQUID CRYSTAL DISPLAY DEVICE

CLAIMS OF PRIORITY

The present application claims priority from Japanese Patent Application JP 2022-153179 filed on Sep. 27, 2022, the content of which is hereby incorporated by reference into this application.

BACKGROUND OF THE INVENTION

1. Field of the Invention

The present invention relates to a display device, and particularly to a mounting structure for mounting a liquid crystal display device on a transparent medium.

2. Description of the Related Art

Demands for a transparent display device through which the background can be seen like a glass plate exist. In a transparent display device, when an image is displayed, it is possible to display a screen image in an overlaid relation with backgrounds individually on the front side and the rear side of the transparent display device. Such a transparent display device as just described can be implemented, for example, using a liquid crystal display device.

Japanese Patent Laid-open Nos. 2021-92748, 2021-92702, and 2021-184052 disclose a configuration that implements a transparent liquid crystal display device with use of what is generally called polymer dispersed liquid crystal.

SUMMARY OF THE INVENTION

Although a transparent display device is sometimes used alone as a display device, a mode has been developed in which a transparent display device is affixed to a transparent medium such as a glass window such that, when display by the display device is not required, the transparent display device is used as an ordinary glass window, but when the display by the display device is required, the transparent display device is used as a display device. For the transparent display device, an organic electroluminescence (EL) display device, a liquid crystal display device, and so forth can be used. A transparent liquid crystal display device is more suitable for such an application as described above because it has a high transmittance.

While a transparent liquid crystal display device uses a light emitting diode (LED) as a light source, the LED generates much heat. Further, while the transparent liquid crystal display device is driven field-sequentially, in this case, a driver integrated circuit (IC) therefor generates much heat. Also in the case where the transparent liquid crystal display device is placed in a window, it is necessary to solve this problem of heat generation.

Various types of windows are available, and also it is necessary to change the structure of the transparent liquid crystal display device according to the type of the window. Meanwhile, also in regard to the structure of the window, it is sometimes necessary to change the structure according to mounting of the transparent liquid crystal display device.

The present invention is intended to solve such problems as described above and implement a configuration by which a transparent display device is placed on a transparent medium such as a glass plate in such a manner as to take measures against heat generation from a drive IC or an LED and besides not to impair the design as the transmission medium.

The present invention is further intended to implement a transparent display device system that is high in reliability and high in quality.

The present invention solves the problems described above and takes representative measures as follows.

(1) There is provided a mounting structure for a transparent liquid crystal display device that is placed in a glass window in which a periphery of a first glass plate is accommodated in and held by a first frame member. The transparent liquid crystal display device is affixed to the first glass plate by a transparent adhesive sheet and has a display region and a terminal region. The terminal region is accommodated in the first frame member. A light source including an LED and a driver IC are placed in the terminal region. A heat conduction sheet is placed between the light source and the driver IC on one hand and the first frame member on the other hand and is acted upon by pressure by which the heat conduction sheet is pressed against the light source and the driver IC.

(2) In the mounting structure for a transparent liquid crystal display device described in (1) above, a second frame member is placed between the first frame member and the terminal region, and the heat conduction sheet is acted upon by pressure by which the heat conduction sheet is pressed against the light source and the driver IC.

(3) In the mounting structure for a transparent liquid crystal display device described in (1) above, a first hole is formed in a first side face of the first frame member, and a first microphone of a small size is placed at a portion inside the first frame member corresponding to the first hole.

(4) There is provided a mounting structure for a transparent liquid crystal display device that is placed in a space defined between pair glass plates, the pair glass plates including a first glass plate and a second glass plate bonded to each other by a sealing medium with the space defined therebetween, such that a periphery of the pair glass plates is accommodated in and held by a first frame member. The transparent liquid crystal display device is affixed to the first glass plate by a transparent adhesive sheet and has a display region and a terminal region. The terminal region is accommodated in the first frame member. A light source including an LED and a driver IC are placed in the terminal region. A heat conduction sheet is placed between the light source and the driver IC on one hand and the first frame member on the other hand and is acted upon by pressure by which the heat conduction sheet is pressed against the light source and the driver IC.

(5) There is provided a mounting structure for a transparent liquid crystal display device that is placed in a first space of triple glass plates, the triple glass plates including a first glass plate and a second glass plate bonded to each other by a first sealing medium with the first space defined therebetween and a third glass plate bonded to the second glass plate by a second sealing medium with a second space defined therebetween, the triple glass plates having a periphery accommodated in and held by a first frame member. The transparent liquid crystal display device is affixed to the first glass plate by a transparent adhesive sheet and has a display region and a terminal region. The terminal region is accommodated in the first frame member. A light source including an LED and a driver IC are placed in the terminal region. A heat conduction sheet is placed between the light source and the driver IC on one hand and the first frame member on the

BRIEF DESCRIPTION OF THE DRAWINGS

FIG. 17 is a cross sectional view depicting a first form of an embodiment 3;

DETAILED DESCRIPTION OF THE PREFERRED EMBODIMENTS

Figure 1:
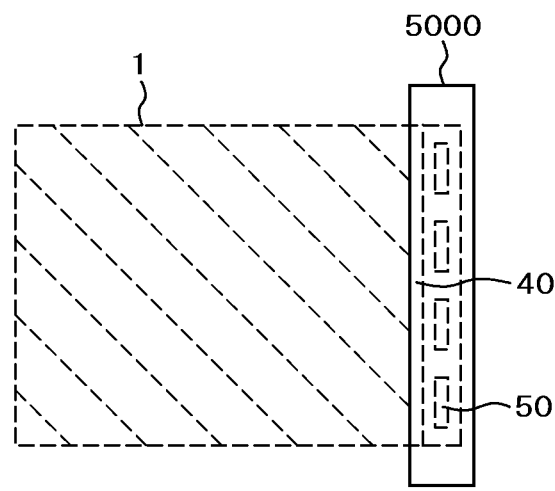
FIG. 1 is a front elevational view of a transparent liquid crystal display device.
Figure 2:
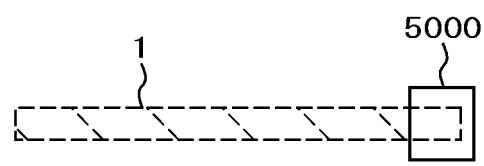
FIG. 2 is a side elevational view of the transparent liquid crystal display device.

FIG. 1 is a front elevational view of a transparent liquid crystal display device 1 that is used alone, and FIG. 2 is a side elevational view of the transparent liquid crystal display device 1. FIGS. 1 and 2 illustrate an example of a general transparent liquid crystal display device. In FIGS. 1 and 2, since no backlight exists on a back face of a display region of the transparent liquid crystal display device 1 and the board used is made of transparent glass, light usually passes through the display region, and therefore, the back face of the transparent liquid crystal display device 1 can be seen through the board.

In FIG. 1, a light source 40 as a side light, driver ICs 50, and so forth are placed in a pedestal 5000 on the lower side. Since the transparent liquid crystal display device 1 is transparent, an opposite face side of the transparent liquid crystal display device 1 can be seen through the transparent liquid crystal display device 1 as in the case of a glass window. Further, an image displayed on the transparent liquid crystal display device 1 can visually be recognized from both the rear side and the front side of the transparent liquid crystal display device 1. Accordingly, an image displayed on the transparent liquid crystal display device 1 can give such an impression that it emerges in the background.

FIGS. 1 and 2 depict an example of use of the transparent liquid crystal display device, and the transparent liquid crystal display device can be used for various other purposes. For example, by being affixed to a window glass plate, the transparent liquid crystal display device can be used in such a manner that it normally is used as the window glass plate, but when necessary, it displays an image on the window.

A similar configuration may be used as part of a shop window. Alternatively, in a case where the transparent liquid crystal display device is used as a display device for an automobile, it may be used in such a manner that it normally is used as a window through which the outside can be seen, but as occasion demands, it displays an image in the transparent medium.

Figure 3:
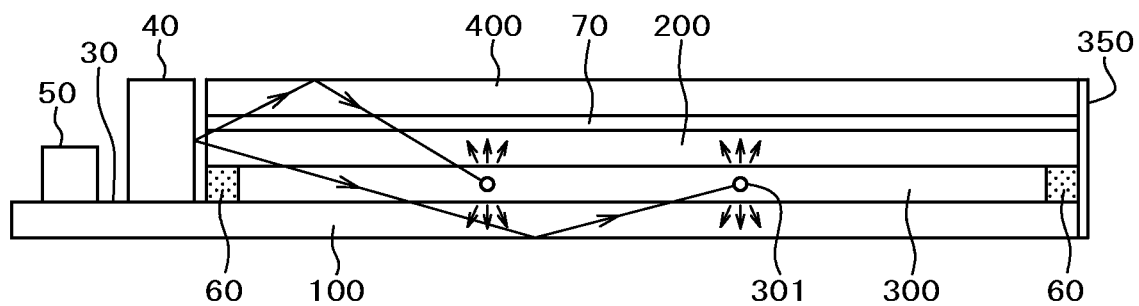
FIG. 3 is a cross sectional view depicting operation of the transparent liquid crystal display device.

FIG. 3 is a cross sectional view depicting operation of the transparent liquid crystal display device. In FIG. 3, liquid crystal 300 is sandwiched between a thin film transistor (TFT) substrate 100 on which pixel electrodes, signal lines, TFTs, and so forth are placed and an opposing substrate 200 on which common electrodes, a black matrix, and so forth are formed. A cover glass plate 400 is placed on the opposing substrate 200. A surface of the cover glass plate 400 is sometimes subject to surface treatment for preventing, when it is touched by a finger, a fingerprint or the like from adhering to the cover glass plate 400. This surface treatment is sometimes called anti-finger (AF) treatment.

The opposing substrate 200 and the cover glass plate 400 are bonded to each other by optical clear adhesive (OCA) 70. The OCA 70 is a transparent adhesive sheet and has a refraction index proximate to that of glass. Accordingly, interface reflection between the OCA 70 and the opposing substrate 200 or between the OCA 70 and the cover glass plate 400 can be suppressed to the minimum. The OCA 70 has a thickness of, for example, 0.1 mm.

Since the liquid crystal display device of FIG. 3 is driven field-sequentially, it does not include any color filter therein. Since no color filter is used, the light transmittance of the display region can be increased as much. The display region is formed in a region in which the TFT substrate 100 and the opposing substrate 200 overlap, and a terminal region 30 is formed in a region of the TFT substrate 100 in which the TFT substrate 100 does not overlap the opposing substrate 200.

In FIG. 3, the TFT substrate 100 and the opposing substrate 200 are bonded to each other by a transparent sealing material 60, and the liquid crystal 300 is encapsulated in a space defined by the TFT substrate 100, the opposing substrate 200, and the sealing material 60. The liquid crystal 300 in FIG. 3 is what is generally called polymer dispersed liquid crystal. Although the liquid crystal constituting the layer of the liquid crystal 300 normally allows passage of light therethrough, if a voltage is applied between a pixel electrode formed on the TFT substrate 100 and a common electrode formed on the opposing substrate 200, a liquid crystal molecule 301 changes in orientation and scatters light. By controlling the scattering action of the liquid crystal molecule 301 for each pixel, an image can be formed. This image can visually be recognized not only from the front face but also from the back face of the liquid crystal display panel.

In FIG. 3, the TFT substrate 100 is formed greater in size than the opposing substrate 200, and the region of the TFT substrate 100 in which the TFT substrate 100 and the opposing substrate 200 do not overlap is used as the terminal region 30. In the terminal region 30, the light source 40 is placed in such a manner as to face a side face of the opposing substrate 200. The light source 40 includes a lens 41 and a plurality of LEDs 42 as depicted in FIG. 4.

Figure 4:
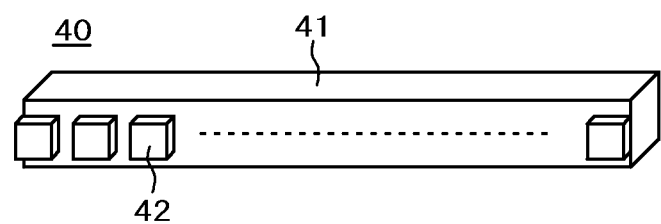
FIG. 4 is a perspective view of a light source.

The light source 40 is configured such that the LEDs 42 are placed on a side face of the lens 41 as depicted in FIG. 4. Light emitted from each LED 42 is acted upon by a conversing or diverging action by the lens 41 and enters the display region of the transparent liquid crystal display device from the side face of the opposing substrate 200 or the cover glass plate 400.

On the LEDs 42, three LED chips that generate light of red, green, and blue are placed for each package. The liquid crystal display device of FIG. 3 is driven field-sequentially. That is, a red image, a green image, and a blue image are displayed time-divisionally to display a color image. In the subsequent drawings, the light source 40 is indicated as an integrated unit of the lens 41 and the LEDs 42.

With reference back to FIG. 3, light from the light source 40 enters the inside of the liquid crystal display panel through the side face of the opposing substrate 200 and the cover glass plate 400 or the sealing material 60. The entering light is thereafter subjected to repetitions of total reflection and collides with the liquid crystal molecules 301 in the liquid crystal 300. If the light collides with a liquid crystal molecule 301 in a pixel in which a voltage is applied between the pixel electrode and the common electrode, it is scattered as depicted in FIG. 3. On the other hand, in a pixel in which no voltage is applied between the pixel electrode and the common electrode, the light advances straightforwardly.

Consequently, since scattering of the light entering the liquid crystal 300 is controlled for each pixel, an image is formed.

In FIG. 3, a reflector 350 is affixed to side faces of the TFT substrate 100, the opposing substrate 200, and the cover glass plate 400 on the side opposite to the light source 40 with the liquid crystal 300, the opposing substrate 200, and the cover glass plate 400 interposed therebetween. The reflector 350 reflects light having reached an end portion toward the display region side. It is to be noted that, in FIG. 5 and the subsequent drawings, illustration of the reflector 350 is omitted. In FIG. 3, the driver ICs 50 are placed alongside the light source 40 in the terminal region 30. Since the liquid crystal display device depicted in FIG. 3 is driven field-sequentially, data processing is performed at a triple speed with respect to that in an ordinary driving method, and therefore, also heat generation of the driver ICs 50 is larger.

Figure 5:
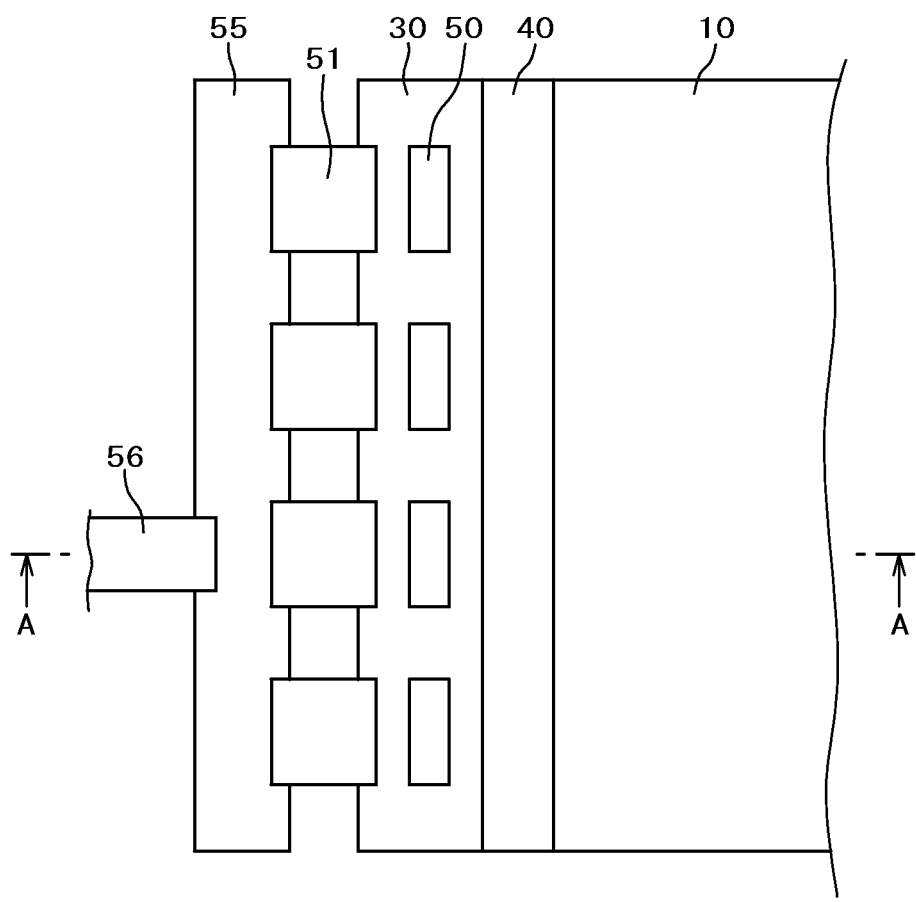
FIG. 5 is a top plan view of the transparent liquid crystal display device.
Figure 6:
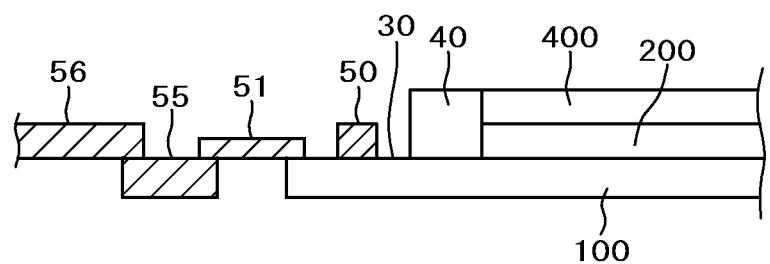
FIG. 6 is a cross sectional view taken along line A-A of FIG. 5.

FIG. 5 is a top plan view of the transparent liquid crystal display device used in the present invention, and FIG. 6 is a cross sectional view taken along line A-A of FIG. 5. It is to be noted that, in the following description, the transparent liquid crystal display device in a state in which a flexible circuit board and so forth are not connected thereto is sometimes referred to as a transparent liquid crystal display panel. In FIG. 5, the light source 40 including LEDs and a lens is placed at an end portion of a display region 10 of the transparent liquid crystal display device, and the driver ICs 50 are placed in the terminal region 30. A printed circuit board (PCB) 55 and the terminal region 30 are connected to each other by flexible circuit boards 51. The flexible circuit boards 51 are placed for the respective driver ICs 50. To the printed circuit board 55, a power supply line 56 for obtaining power supply and signals from the outside is connected.

FIG. 6 is a cross sectional view taken along line A-A of FIG. 5. In FIG. 6, the opposing substrate 200 is placed on the TFT substrate 100, and the cover glass plate 400 is placed on the opposing substrate 200. The TFT substrate 100, the opposing substrate 200, and the cover glass plate 400 each have, for example, a thickness of 0.5 mm. The display region 10 is formed at a portion at which the opposing substrate 200 and the TFT substrate 100 overlap, and the terminal region 30 is formed at a portion of the TFT substrate 100 at which the TFT substrate 100 does not overlap the opposing substrate 200. The light source 40 and the driver ICs 50 are placed in the terminal region 30. Since both the light source 40 and the driver ICs 50 become hot, heat dissipation is necessary.

Figure 7:
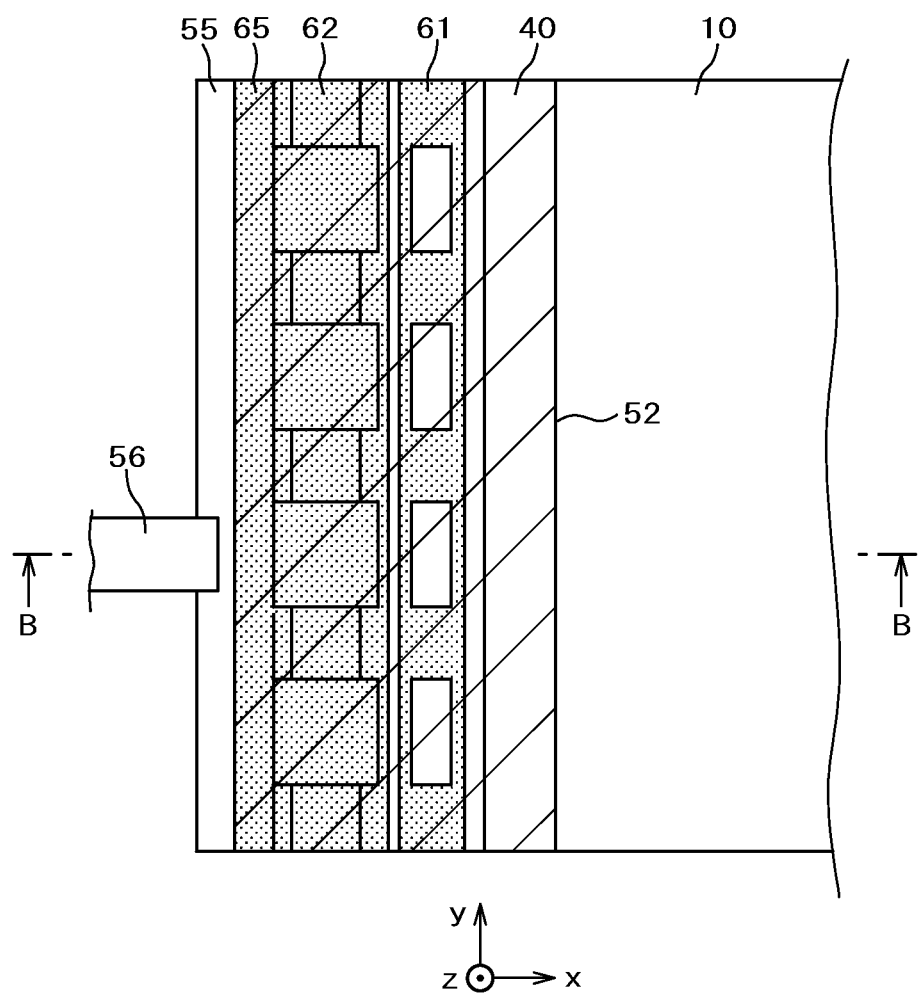
FIG. 7 is a top plan view depicting an LED flexible circuit board placed on the transparent liquid crystal display device of FIG. 5.
Figure 8:
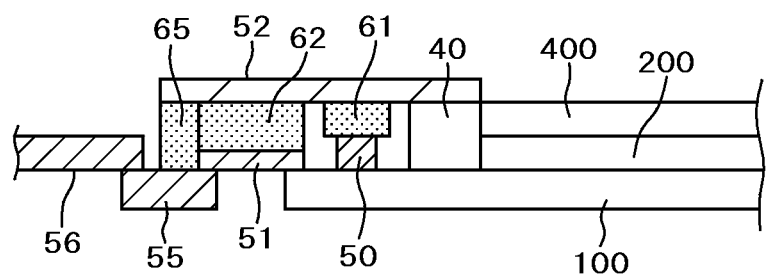
FIG. 8 is a cross sectional view taken along line B-B of FIG. 7.

FIG. 7 is a top plan view depicting several members placed on the structure depicted in FIG. 6. The members mentioned include an LED flexible circuit board 52 and a connecting conductive member 65 for supplying power to the light source 40 including the LEDs, heat conduction sheets 61 and 62 for dissipating heat from the driver ICs 50 and the flexible circuit boards 51, respectively, and so forth. The heat conduction sheets 61 and 62 serve also as spacers. FIG. 8 is a cross sectional view taken along line B-B of FIG. 7. As indicated by slanting lines in FIG. 7, the LED flexible circuit board 52 covers the overall area of the terminal region 30. It is to be noted that, to the driver ICs 50, current and signals are supplied through the driver IC flexible circuit boards 51.

As depicted in FIGS. 7 and 8, the heat conduction sheet 61 is interposed between the driver ICs 50 and the LED flexible circuit board 52, and the heat conduction sheet 62 is interposed between the flexible circuit boards 51 and the LED flexible circuit board 52. As hereinafter described, the heat conduction sheets 61 and 62 are provided for allowing heat from the driver ICs 50 and heat from the light source 40 to be radiated readily to a screen frame of a glass window. As depicted in FIG. 7, the heat conduction sheet 61 is a single strip-shaped sheet elongated in a y direction, and the plurality of driver ICs 50 are covered by the common heat conduction sheet 61. Meanwhile, the heat conduction sheet 62 is a single strip-shaped sheet elongated in the y direction, and the plurality of flexible circuit boards 51 are covered by the common heat conduction sheet 62. If the driver ICs 50 and the flexible circuit boards 51 have no significant difference in thickness, the heat conduction sheets 61 and 62 may be formed as a common sheet.

In FIGS. 7 and 8, the LED flexible circuit board 52 and the printed circuit board 55 are connected to each other by the connecting conductive member 65. The connecting conductive member 65 can be formed using, for example, an anisotropic conductive film (ACF). LED current, driver IC power, signals, and so forth are supplied from the power supply line 56 connected to the printed circuit board 55.

Figure 9:
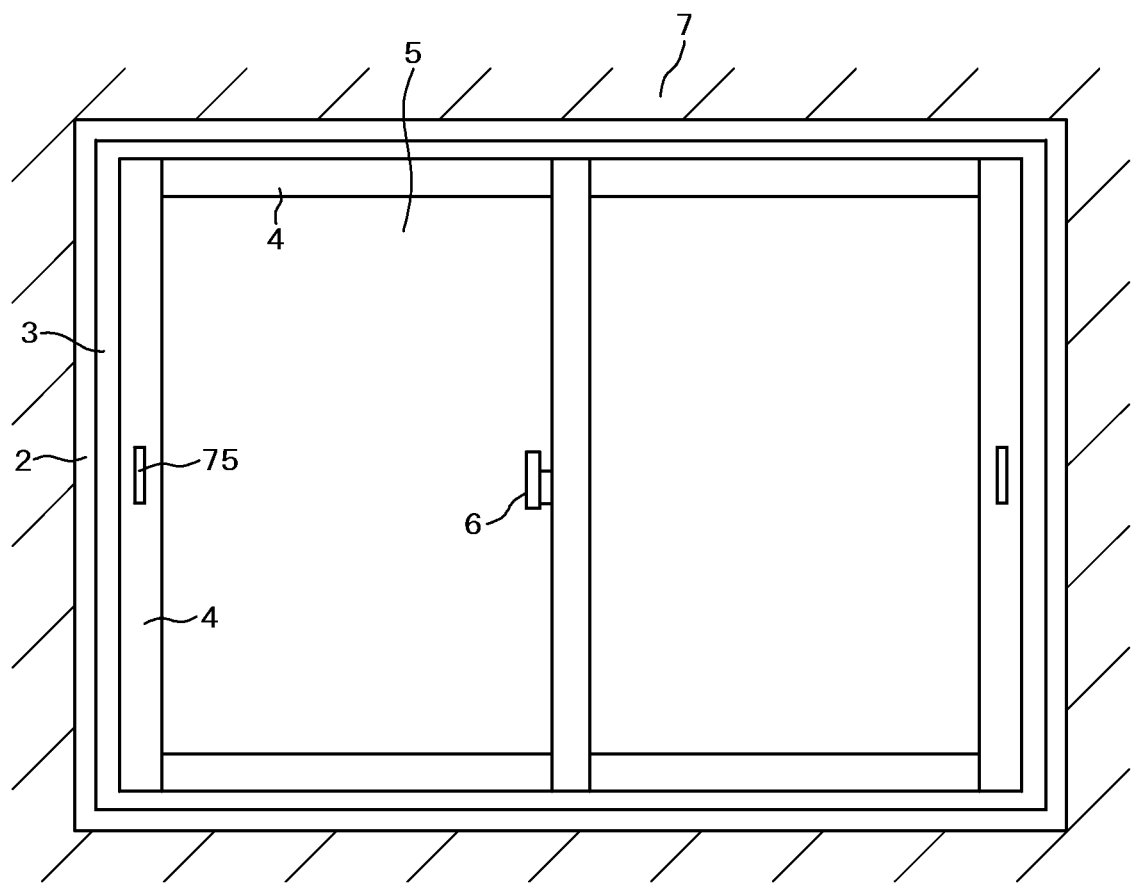
FIG. 9 is a front elevational view depicting portions of a glass window having names defined herein.

FIG. 9 is a front elevational view of a window to which the transparent liquid crystal display device is attached, for explaining definitions of portions of the window and its glass screens. In FIG. 9, a window frame 2 is formed on an inner side of a wall 7. What is generally called a window sash is attached to an inner side of the window frame 2. The window sash includes a sash frame 3 and two glass screens.

The two glass screens have a relation of slide doors relative to each other. Each glass screen includes a screen frame 4 and a window glass plate 5. A lock 6 and a handle 75 are formed on an outer side of the screen frame 4. It is to be noted that the sash frame 3 is fixed, and the glass screens each including the screen frame 4 and the window glass plate 5 move on an inner side of the sash frame 3.

Figure 10:
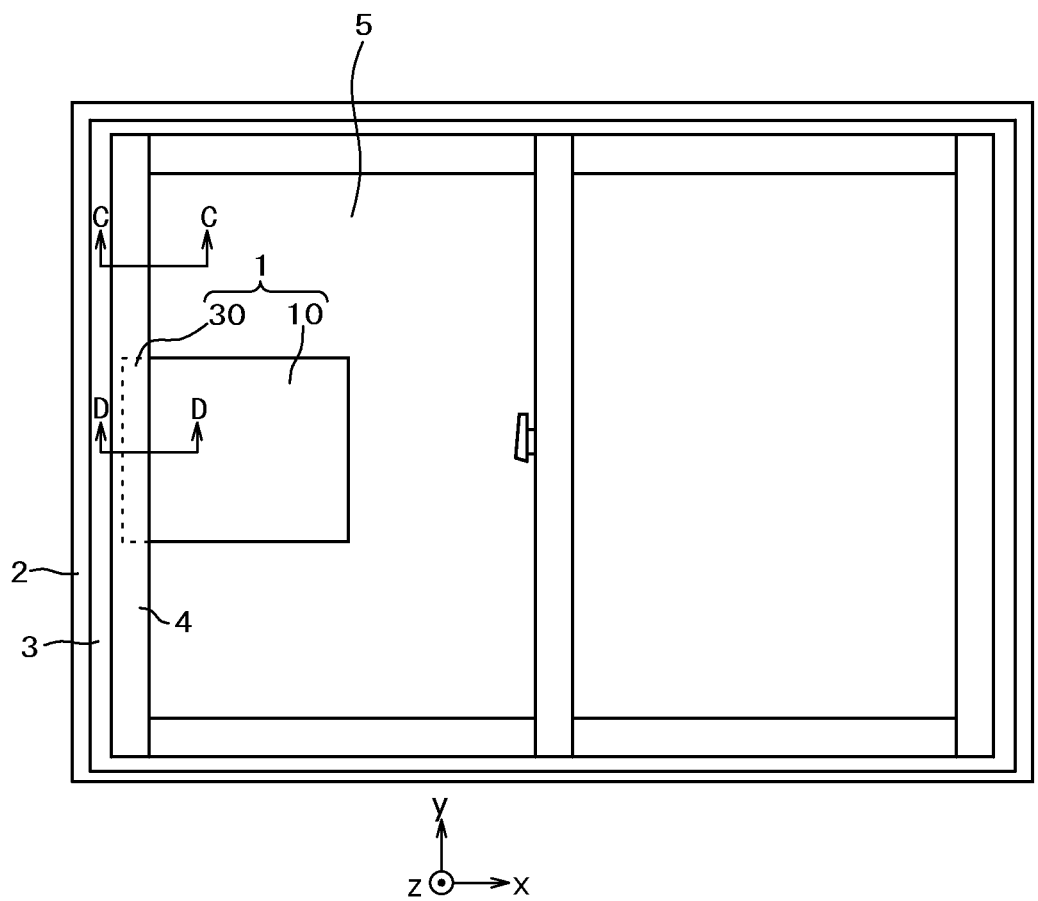
FIG. 10 is a front elevational view depicting the transparent liquid crystal display device in a state affixed to the glass window.

FIG. 10 is a front elevational view depicting the transparent liquid crystal display device 1 placed on the glass screen depicted in FIG. 9. In FIG. 10, the transparent liquid crystal display device 1 is affixed to the window glass plate 5, for example, by an OCA. The window glass plate 5 has peripheral sides placed in the screen frame 4 and held by the screen frame 4. The terminal region 30 of the transparent liquid crystal display device 1 in which the light source, the driver ICs, the flexible circuit boards, and so forth are placed is placed in the screen frame 4 and normally is invisible from the outside.

Figure 11:
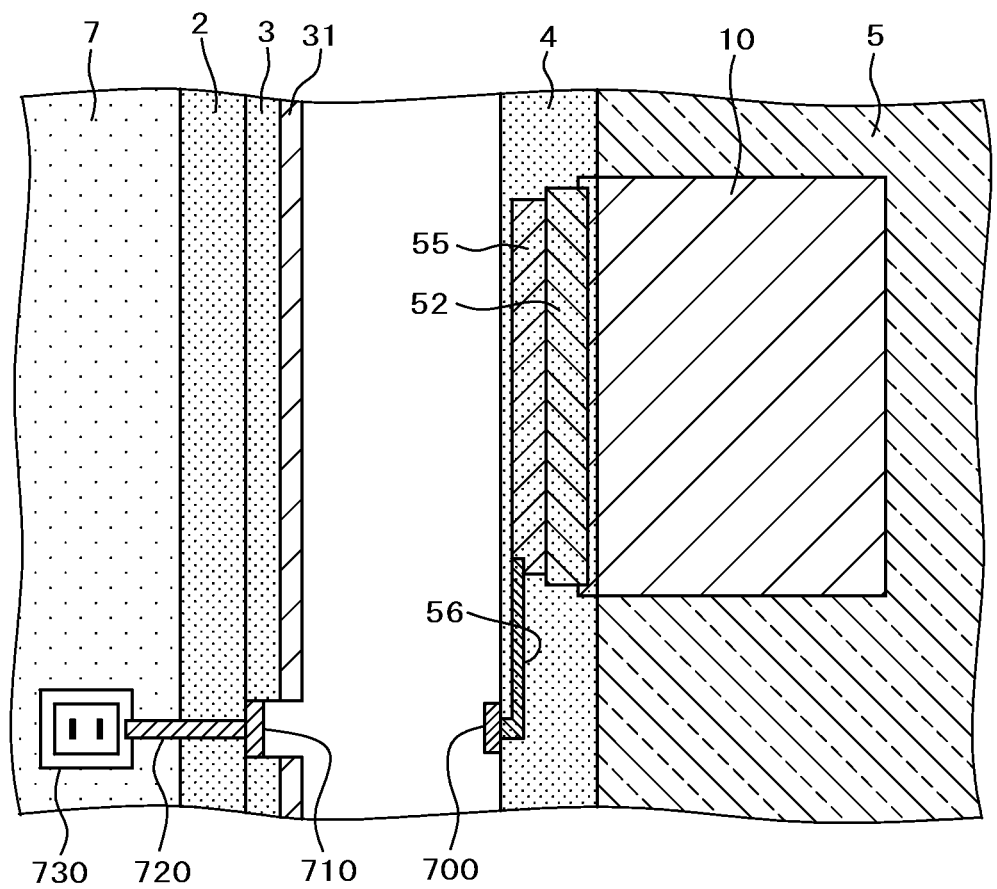
FIG. 11 is a front elevational view depicting an example in which power is supplied to the transparent liquid crystal display device.

FIG. 11 is an enlarged cross sectional view depicting a portion in the proximity of the transparent liquid crystal display device. FIG. 11 depicts a state in which the glass screen is open in order to facilitate understandings. In FIG. 11, the display region 10 of the transparent liquid crystal display device is affixed to the glass window, and the terminal region of the transparent liquid crystal display device is placed in the screen frame 4. The terminal region is represented by the LED flexible circuit board 52, the printed circuit board 55, and the power supply line 56. The power supply line 56 is connected to the printed circuit board 55 and is connected also to a screen side power supply terminal 700.

The sash frame 3 is attached in the window frame 2 on the inner side of the wall 7. When the screen is closed, the screen frame 4 is accommodated such that an end thereof is positioned between edges 31 of the sash frame 3. A sash frame side power supply terminal 710 is attached to the sash frame 3 such that, when the glass screen is closed, power is supplied to the transparent liquid crystal display device to thereby allow displaying by the transparent liquid crystal display device. A cable 720 connected to the sash frame side power supply terminal 710 extends through a cutout formed in the window frame 2 and is connected to a power socket 730.

Figure 12:
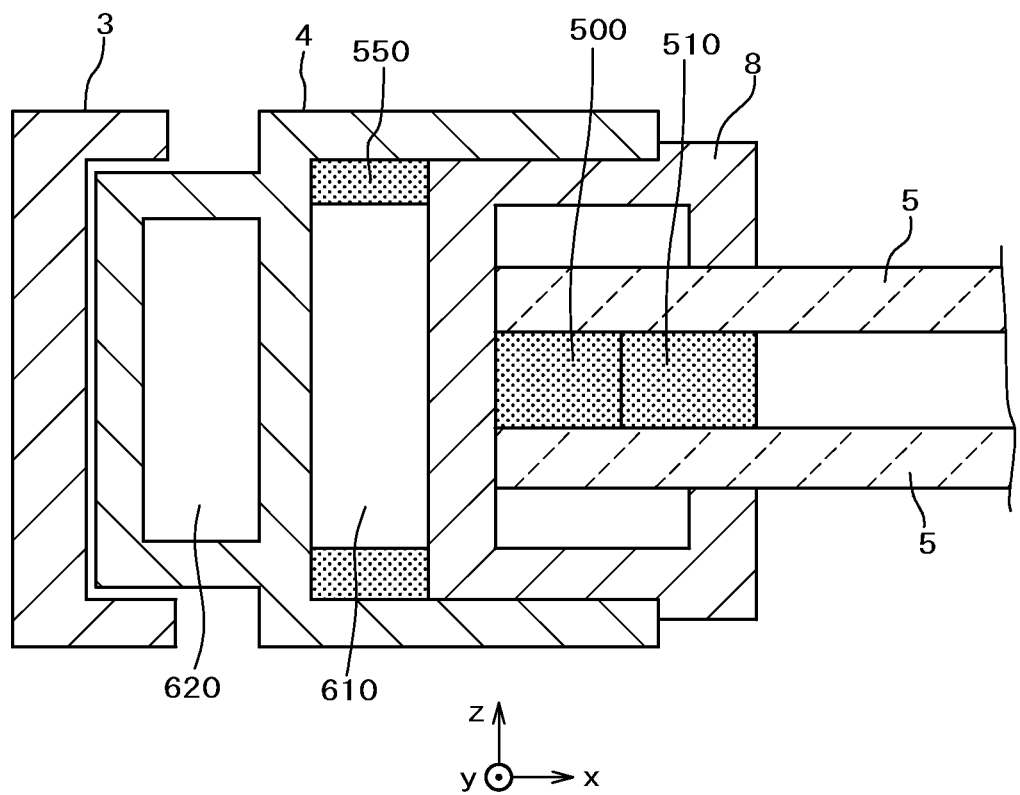
FIG. 12 is a cross sectional view taken along line C-C of FIG. 10.

FIG. 12 is a cross sectional view depicting details of the screen frame 4 and the sash frame 3 of the glass screen used in embodiments of the present invention. FIG. 12 is a cross sectional view corresponding to a cross sectional view taken along line C-C of FIG. 10. In FIG. 12, pair glass plates are used for the window glass plate 5. The pair glass plates are superior in heat insulation effect, sound insulation effect, and so forth. In FIG. 12, the two glass plates are sealed by a sealing medium 500, and a drying agent 510 is placed in a space defined by the two glass plates and the sealing medium 500, in order to prevent generation of water droplets and so forth.

In FIG. 12, the periphery of the pair glass plates is accommodated in a packing 8. The packing 8 is configured, for example, from a rubber packing such that it has spring force in itself and can hold the pair glass plates. According to the present invention, in order to allow heat generated by the driver ICs 50 and the LEDs in the transparent liquid crystal display device to escape efficiently, heat conductive rubber is used for the rubber packing 8.

The rubber packing 8 is accommodated in the screen frame 4. While the screen frame 4 is formed of aluminum, the rubber packing 8 is acted upon by pressure by springback of the screen frame 4. Accordingly, the window glass plate 5 is acted upon by pressure also by springback of the screen frame 4 in addition to springback of the rubber packing 8, and therefore, the window glass plate 5 can be fixed with certainty.

In FIG. 12, spacers 550 are placed between a bottom face of the rubber packing 8 and a bottom face of the screen frame 4 in order to form a first space 610 between them. In the first space 610, for example, a printed circuit board or the like of the transparent liquid crystal display device may possibly be placed. While, in FIG. 12, the spacers 550 are placed in corners of the first space 610, there is no necessity to dispose the spacers 550 only in corners. Alternatively, only one spacer may be placed in the proximity of a central portion of the first space 610.

The screen frame 4 has a stepped portion, in which a second space 620 is defined. In the second space 620, a power supply line for supplying power or signals to the transparent liquid crystal display device is sometimes laid. Further, as occasion demands, it is also possible to place a built-in microphone in the second space 620 as indicated in an embodiment 4 hereinafter described. When the glass screen is closed, part of the screen frame 4 is placed in the sash frame 3.

Embodiment 1

Figure 13:
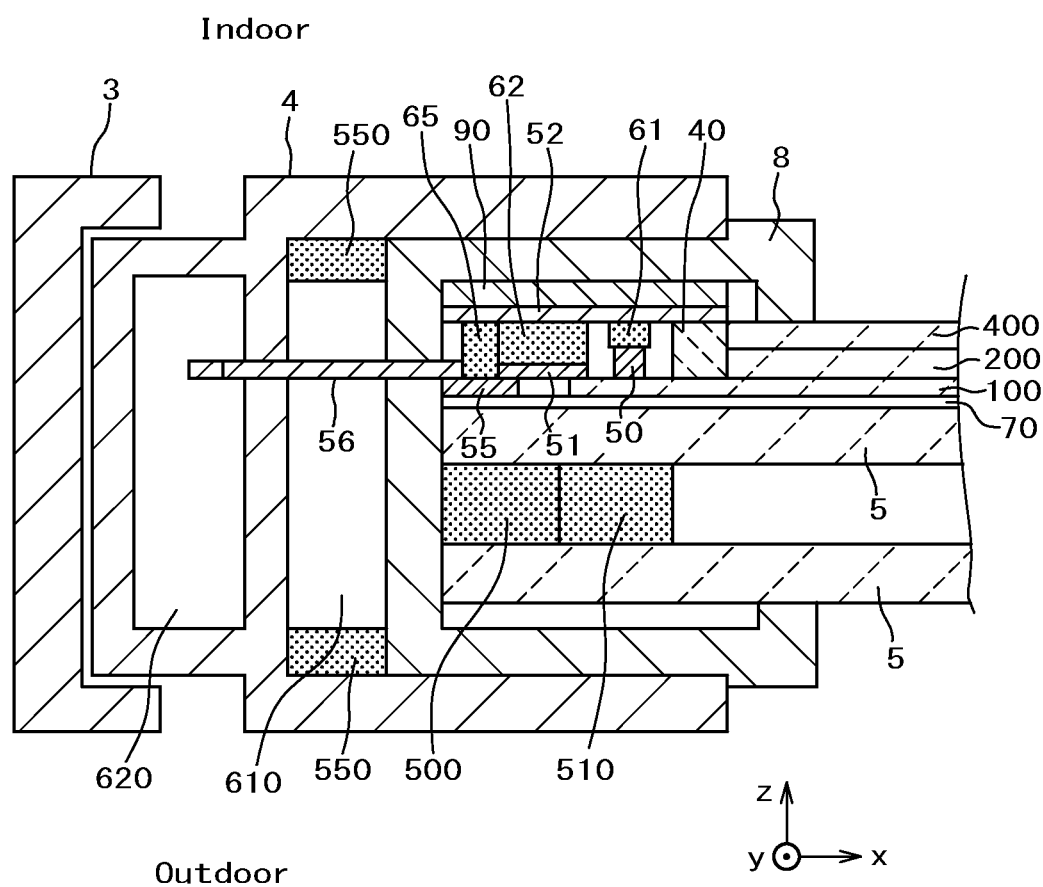
FIG. 13 is a cross sectional view depicting a first form of an embodiment 1.

FIG. 13 is a cross sectional view of the inside of the screen frame 4, for depicting a configuration of the glass window provided with the transparent liquid crystal display device according to a first form of an embodiment 1. FIG. 13 is a cross sectional view corresponding to a cross section taken along line D-D of FIG. 10. In FIG. 13, an upper side in the view indicates an indoor side while a lower side in the view indicates an outdoor side. In FIG. 13, the window glass plate 5 has a pair glass configuration. The pair glass configuration is such as described hereinabove with reference to FIG. 12. In FIG. 13, the transparent liquid crystal display device is placed on the indoor side glass plate of the window glass plate 5. The transparent liquid crystal display device is affixed to the window glass plate by the OCA 70. In particular, the TFT substrate 100 and the printed circuit board 55 are affixed to the window glass plate 5 through the OCA 70. Also the flexible circuit boards 51 may be affixed to the window glass plate 5 by the OCA 70.

A region in which the opposing substrate 200 and the cover glass plate 400 are affixed to the TFT substrate 100 is the display region of the transparent liquid crystal display device, and a region in which only the TFT substrate 100 exists is the terminal region. In the terminal region, the light source 40 having the LEDs that serve as heat sources and the driver ICs 50 are placed. Also the flexible circuit boards 51 placed in the proximity of the driver ICs 50 become hot. If the LED becomes hot, its light emission efficiency drops, and if the driver IC 50 becomes hot, it causes malfunction.

The transparent liquid crystal display device of FIG. 13 has such features as described hereinabove with reference to FIG. 8. In FIG. 13, the heat conduction sheet 61 is interposed between the LED flexible circuit board 52 and the driver ICs 50, the heat conduction sheet 62 is interposed between the LED flexible circuit board 52 and the flexible circuit boards 51, and a heat pipe 90 is placed on the LED flexible circuit board 52. The heat pipe 90 is covered with the heat conductive rubber packing 8 such that the heat pipe 90 is acted upon by pressure from the rubber packing 8. The rubber packing 8 itself applies pressure to the heat pipe 90 from above.

It is to be noted that the heat pipe 90 is configured such that a fine pipe is formed in a metal sheet of copper or the like and fluid is circulated in the fine pipe to move heat. In recent years, a heat pipe similar to the heat pipe 90 is used also in smartphones, and a heat pipe having a thickness equal to or smaller than 1 mm has been developed. It is to be noted that a metal sheet of copper or the like that is superior in heat conduction may be used in place of the heat pipe 90. Further, a resin sheet superior in heat conduction may be used. As the material for a heat conductive resin sheet, for example, a carbon fiber material, a silicone resin material, an acrylic resin material, and so forth are available.

While the rubber packing 8 is placed in the screen frame 4 formed of aluminum, also the springback of the screen frame 4 exerts such pressure as to press the rubber packing 8 to the heat pipe 90 side. In FIG. 13, this phenomenon is indicated by a portion of the screen frame 4 that bites in the rubber packing 8. That is, in FIG. 13, the heat pipe 90 is configured such that it is pressed against the light source 40 and against the driver ICs 50 and the flexible circuit boards 51 through the heat conduction sheets 61 and 62, respectively, by both the spring force of the rubber packing 8 and the springback of the screen frame 4.

Accordingly, heat generated by the LEDs and the driver ICs 50 can be moved to the heat conductive rubber packing 8 and further to the screen frame 4 formed of aluminum, very efficiently through the heat pipe 90. Since the screen frame 4 is formed of aluminum, it has a high heat conduction and acts as a superior heat sink. In this manner, the embodiment 1 provides a transparent liquid crystal display device that is very superior in heat dissipation effect, and can implement a transparent liquid crystal display device having high reliability.

In FIG. 13, the power supply line 56 passes through a hole formed in both the rubber packing 8 and the screen frame 4 and extends downwardly in the second space 620 to be connected to the screen side power supply terminal 700. This similarly applies to the subsequent drawings. Further, since the transparent liquid crystal display device is attached to the indoor side glass plate of the window glass plate 5, it is not exposed to a severe environment of external air. Further, while the terminal region of the transparent liquid crystal display device according to the configuration of FIG. 13 is surrounded by the rubber packing 8, since it is not sealed, such a situation that water is accumulated inside the rubber packing 8 and deteriorates the reliability of the transparent liquid crystal display device does not occur.

Figure 14:
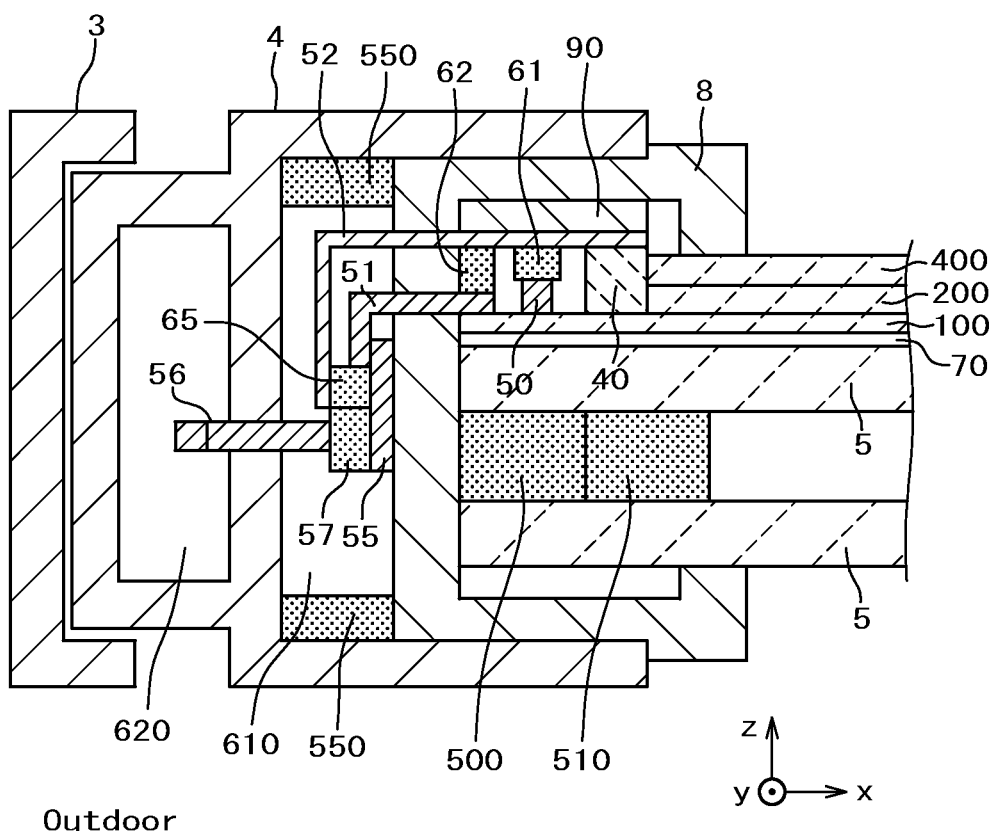
FIG. 14 is a cross sectional view depicting a second form of the embodiment 1.

FIG. 14 is a cross sectional view of the inside of the screen frame 4, for depicting a configuration of the glass window provided with the transparent liquid crystal display device according to a second form of the embodiment 1. FIG. 14 is a cross sectional view corresponding to the cross section taken along line D-D of FIG. 10. An upper side in FIG. 14 indicates the indoor side while a lower side indicates the outdoor side. Also the configuration of the other part in FIG. 14 is the same as that in FIG. 13 except that the printed circuit board 55 is placed in the first space 610 defined by the bottom face of the rubber packing 8 and the bottom face of the screen frame 4.

In FIG. 14, the flexible circuit board 51 is formed long and is connected to the printed circuit board 55 placed in the first space 610. Further, the LED flexible circuit board 52 is formed long and is connected to the connecting conductive member 65 placed on the printed circuit board 55 placed in the first space 610. Further, in order to allow the power supply line 56 to extend to the second space 620 of the screen frame 4, a socket 57 is attached to the printed circuit board 55.

The configuration of FIG. 14 is characterized in that a side on the terminal region side of the TFT substrate 100 of the transparent liquid crystal display device coincides with a side of the window glass plate 5, or in that the side of the TFT substrate 100 on the terminal region side is in contact with the bottom face of the rubber packing 8. This configuration facilitates positioning between the transparent liquid crystal display device and the window glass plate 5. Further, since an end portion of the TFT substrate 100 is in contact with a bottom portion of the rubber packing 8, a deviation in dimension by vibration or the like to the window can be reduced.

Also with the configuration of FIG. 14, the heat dissipation effect for the heat generated from the LEDs and the driver ICs 50 is similar to that of the configuration of FIG. 13. Further, other features of the structure described hereinabove with reference to FIG. 13 are similar to those of the configuration of FIG. 14.

The configuration of the embodiment 1 described above is a configuration in which the transparent liquid crystal display device is attached to one of the pair glass plates of the window glass plate 5. Incidentally, the configuration of the embodiment 1 can be applied also to a case in which the window glass plate 5 does not have pair glass plates and is formed as a single glass plate. Further, in regard to the heat dissipation effect and so forth of the embodiment 1 described hereinabove in connection with pair glass plates, similar effects can be achieved also where a single glass plate is used as the window glass plate 5.

Embodiment 2

Figure 15:
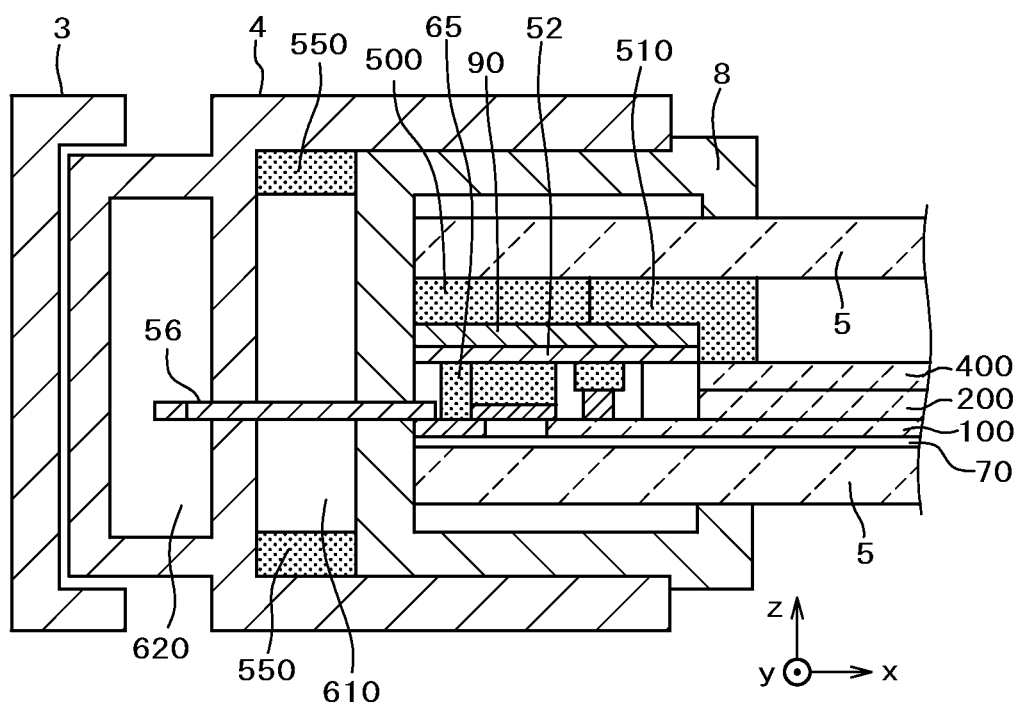
FIG. 15 is a cross sectional view depicting a first form of an embodiment 2.

FIG. 15 is a cross sectional view of the inside of the screen frame 4, for depicting a configuration of the glass window provided with the transparent liquid crystal display device according to a first form of an embodiment 2. FIG. 15 is a cross sectional view corresponding to the cross section taken along line D-D of FIG. 10. While the window glass plate 5 in FIG. 15 is formed as pair glass plates, the present embodiment is characterized in that the transparent liquid crystal display device is placed between the two pair glass plates 5. Since a space originally exists between the pair glass plates, by disposing the transparent liquid crystal display device in this space, an increase in thickness of the glass window as a whole can be suppressed.

In FIG. 15, the transparent liquid crystal display device is affixed to one of the pair glass plates 5 by the OCA 70. The transparent liquid crystal display device is the same as that described hereinabove with reference to FIG. 8 or to FIG. 13 of the embodiment 1. The sealing medium 500 for affixing the two glass plates 5 to each other and the drying agent 510 exist also in the cross section depicted in FIG. 15. However, the sealing medium 500 and the drying agent 510 in the cross section are smaller in thickness or amount than those in the other region in which the transparent liquid crystal display device does not exist.

Also in the configuration of FIG. 15, the pair glass plates 5 are acted upon by pushing pressure from the rubber packing 8 and the screen frame 4 as in the description with reference to FIG. 12. As a result, the transparent liquid crystal display device placed between the pair glass plates 5 is acted upon by pushing pressure from the pair glass plates 5. Accordingly, in FIG. 15, the heat pipe 90 placed on the LED flexible circuit board 52 is in contact under sufficient pushing pressure with the sealing medium 500 and the drying agent 510. Since the heat pipe 90 exhibits a superior effect in movement of heat, it can move heat from the LED flexible circuit board 52 quickly to the sealing medium 500 or the heat conductive rubber packing 8 side.

With use of a heat conductive sealing medium formed of epoxy resin or silicone resin for the sealing medium 500, heat flows to the heat conductive rubber packing 8 and is absorbed by the screen frame 4 formed of aluminum through the rubber packing 8. Since aluminum has a high heat conductivity, the screen frame 4 has a superior performance as a heat sink.

In FIG. 15, the power supply line 56 connected to the printed circuit board 55 extends through the first space 610 of the screen frame 4 to the second space 620. Also the configuration of the other part in FIG. 15 is the same as that in FIG. 13 of the embodiment 1. Also in FIG. 15, since the transparent liquid crystal display device and the heat pipe 90 are acted upon by pushing pressure from the rubber packing 8 and the screen frame 4, they are superior in heat conduction effect. Further, by heat conduction to the conductive rubber packing 8 and further to the screen frame 4 as a heat sink formed of aluminum through the sealing medium 500 and so forth, it is possible to suppress the temperature rise of the driver ICs 50 and the LEDs and secure a display performance and reliability of the transparent liquid crystal display device.

Figure 16:
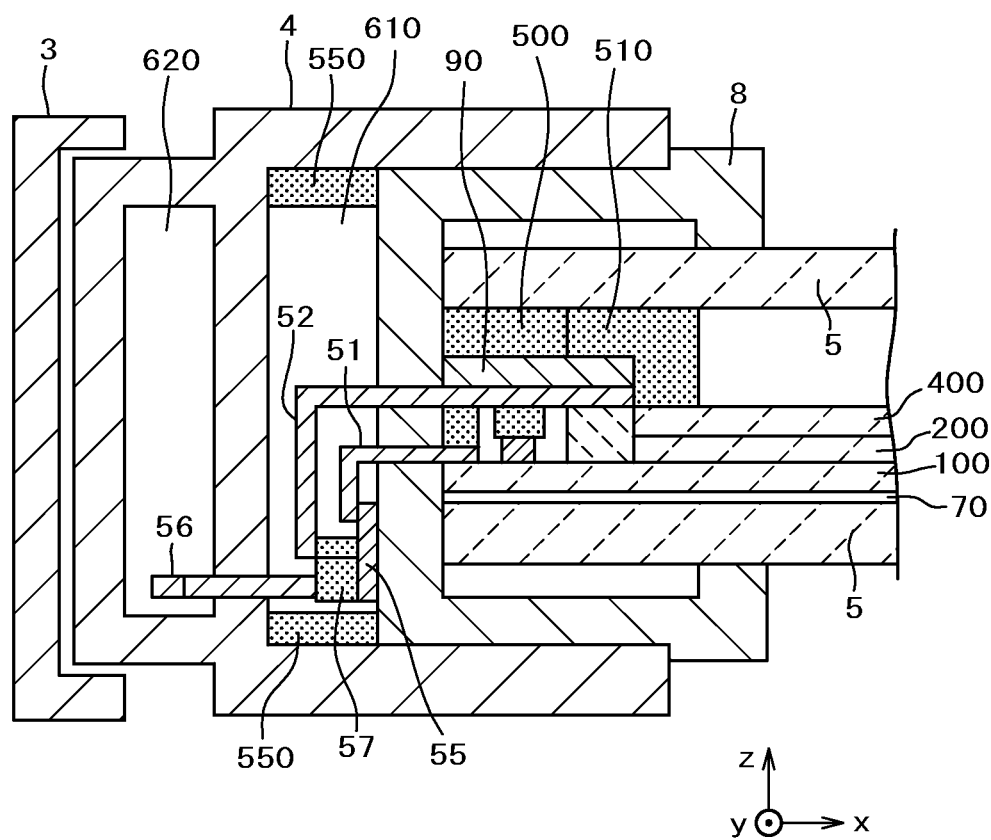
FIG. 16 is a cross sectional view depicting a second form of the embodiment 2.

FIG. 16 is a cross sectional view depicting a second form of the embodiment 2. In FIG. 16, the second form of the embodiment 2 is the same in configuration as the second form of the embodiment 1 depicted in FIG. 14 except that the transparent liquid crystal display device is placed between the pair glass plates 5. That is, in FIG. 16, the end portion of the TFT substrate 100 is in contact with the bottom portion of the rubber packing 8, and the printed circuit board 55 exists in the first space 610 of the screen frame 4. The effect of this is the same as that described hereinabove with reference to FIG. 14.

The terminal region of FIG. 16 is the same in cross sectional structure in an upward-downward direction (z direction) as that of FIG. 15.

Accordingly, also in FIG. 16, heat from the LEDs and the driver ICs 50 can be let efficiently escape to the heat conductive rubber packing 8 and further to the screen frame 4 as a heat sink by a superior thermal contact effect and a heat conduction effect.

Embodiment 3

FIG. 17 is a cross sectional view of the inside of the screen frame 4, for depicting a configuration of the glass window provided with the transparent liquid crystal display device according to a first form of an embodiment 3. FIG. 17 is a cross sectional view corresponding to the cross section taken along line D-D of FIG. 10. In FIG. 17, triple glass plates are used for the window glass plate 5. The triple glass plates are more superior in heat insulation effect and sound insulation effect than pair glass plates. In FIG. 17, an upper side (in the z direction) in the view indicates the outdoor side while a lower side (in the z direction) in the view indicates the indoor side.

In FIG. 17, the transparent liquid crystal display device is placed between two indoor side glass plates from among the three glass plates of the window glass plate 5. This makes it possible to reduce deterioration of the transparent liquid crystal display device caused by ultraviolet rays of sunlight or the like. In FIG. 17, the configuration of the transparent liquid crystal display device sandwiched between the two glass plates is similar to that in FIG. 15. Also the principle of heat dissipation from the LEDs and the driver ICs 50 is the same as that described hereinabove with reference to FIG. 15.

Accordingly, even with the configuration that includes three window glass plates, heat can be dissipated efficiently as in the embodiment 2. It is to be noted that, while, in FIG. 17, also a distance between the two outer side glass plates is increased according to a distance between the two inner side glass plates, the distance can freely be set and need not be made match the distance between the two inner side glass plates.

Figure 18:
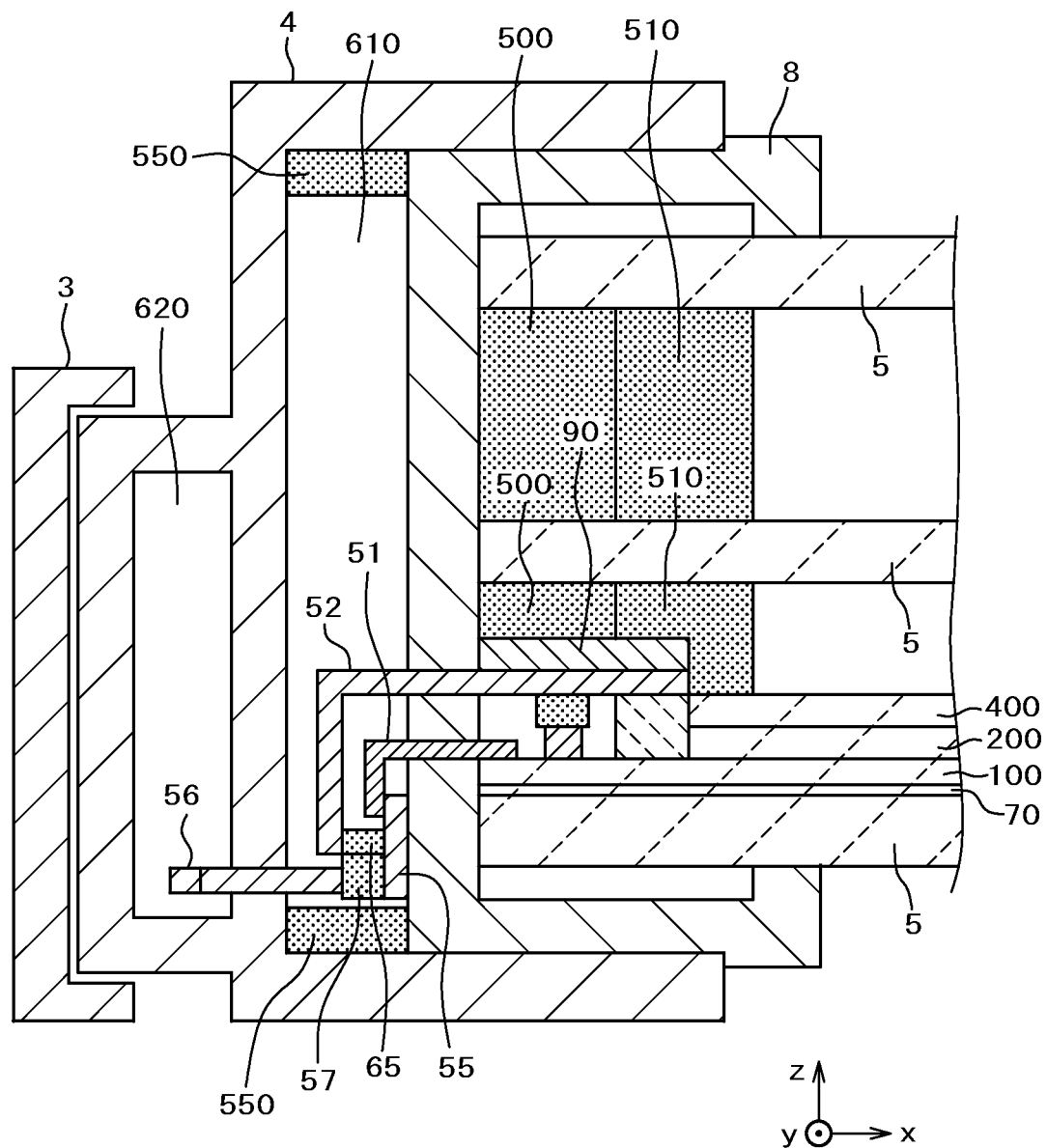
FIG. 18 is a cross sectional view depicting a second form of the embodiment 3.

FIG. 18 is a cross sectional view depicting a second form of the embodiment 3. FIG. 18 is the same as FIG. 16 of the second form of the embodiment 2 except that the window glass plate 5 has a triple glass plate configuration. That is, in FIG. 18, the transparent liquid crystal display device is placed between two inner side glass plates from among the three glass plates of the window glass plate 5. If the two inner side glass plates in FIG. 18 are replaced by the pair glass plates in FIG. 16, the same heat dissipation effect is obtained. Accordingly, as described in the second form of the embodiment 2, also in the present embodiment, heat from the LEDs and the driver ICs 50 can be let escape efficiently.

It is to be noted that, while, in FIG. 18, also a distance between the two outer side glass plates is increased according to a distance between the two inner side glass plates, the distance can freely be set and need not be made match the distance between the two inner side glass plates.

Embodiment 4

In a case where an image is displayed outdoors from the indoor by the transparent liquid crystal display device, when the window is closed, communication with the outdoor by voice cannot be performed. Such a case as just described supposes a scene in which face-to-face communication by voice with the transparent liquid crystal display device is performed through the closed glass window.

Figure 19:
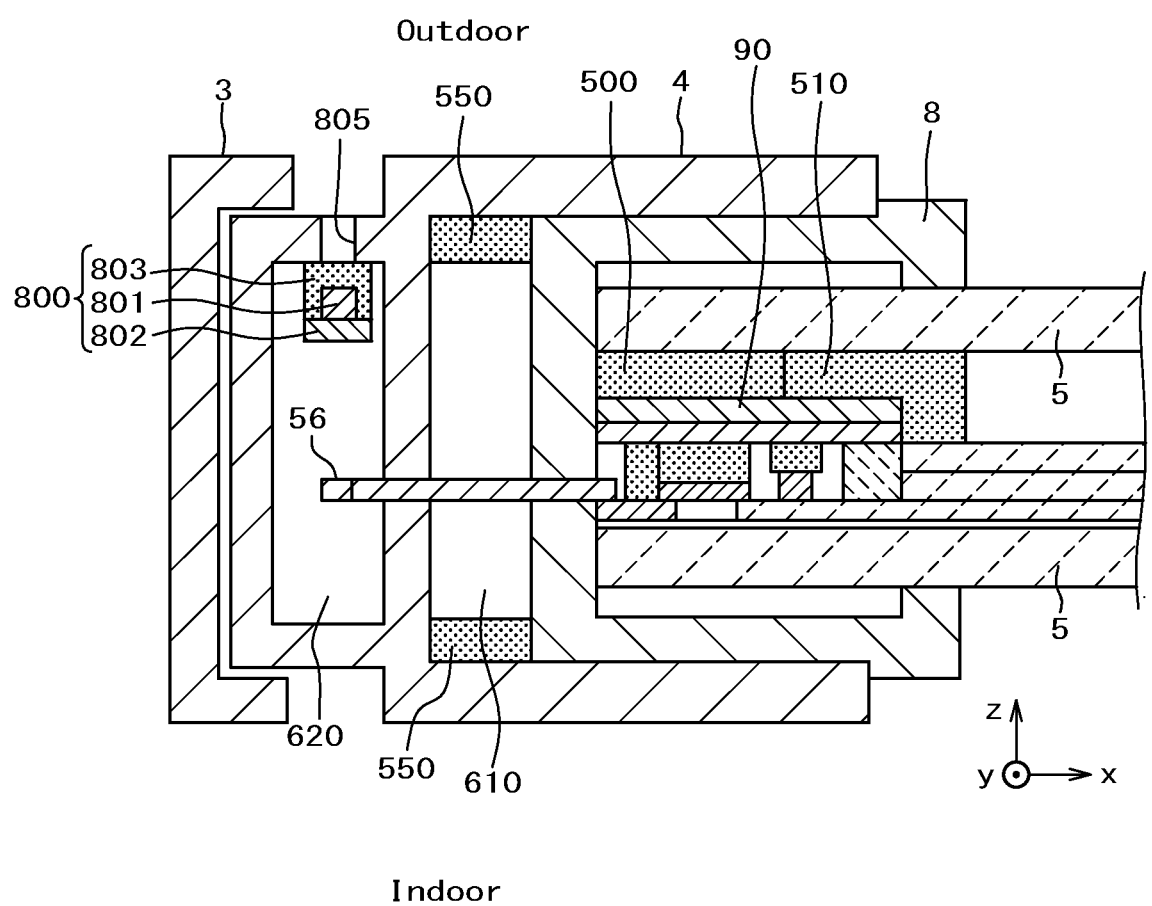
FIG. 19 is a cross sectional view depicting a first form of an embodiment 4.

FIG. 19 is a cross sectional view depicting a mounting structure having a countermeasure against such a subject as just described. In FIG. 19, the attachment structure of the transparent liquid crystal display device to the window glass plate 5 is the same as that in FIG. 15 of the embodiment 2 except that a microphone module 800 of a small size similar to one used in a personal computer or the like is built in the second space of the screen frame 4.

In FIG. 19, an upper side (in the z direction) in the view indicates the outdoor side while a lower side (in the z direction) in the view indicates the indoor side. A microphone hole 805 is formed in an outer side frame for the second space of the screen frame 4, and the microphone module 800 is placed in the proximity of the microphone hole 805. The microphone module 800 includes a microphone main body 801, a microphone circuit board 802, and a cushion member 803. If sound from the outside is recognized by the microphone main body 801 through the microphone hole 805, the sound is converted into an electric signal, and this signal is fetched into a speaker provided indoors, and is outputted as sound from the speaker.

Figure 20:
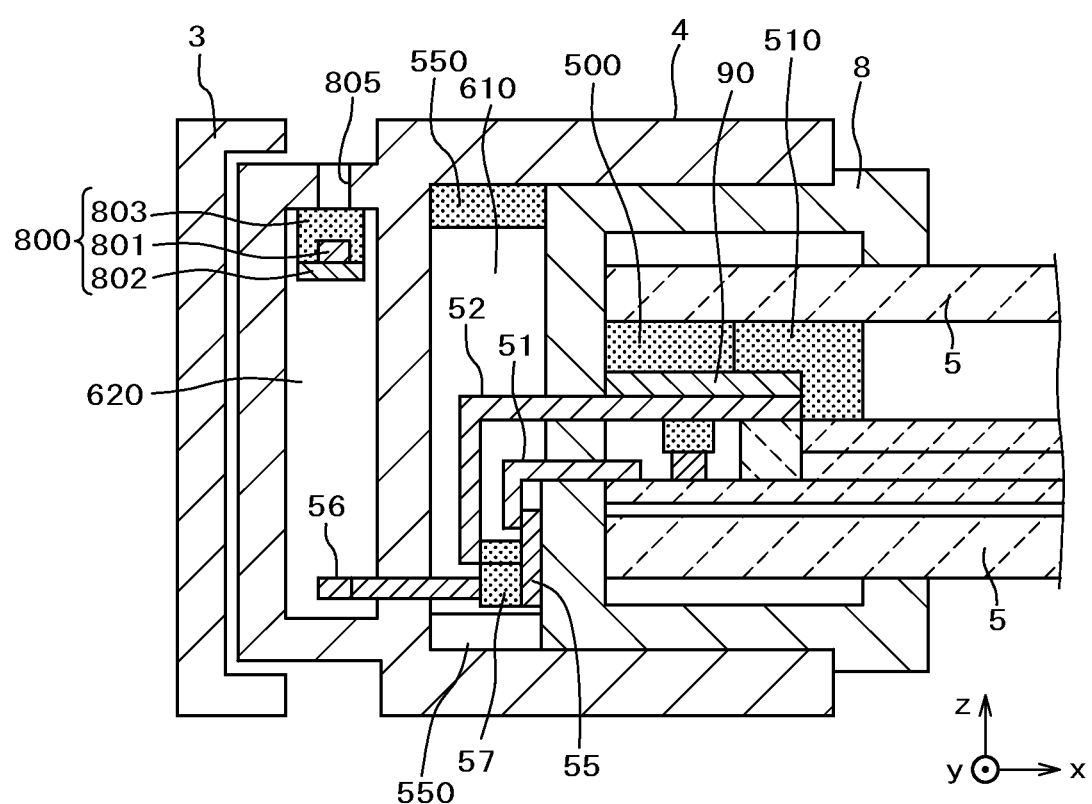
FIG. 20 is a cross sectional view depicting a second form of the embodiment 4.

FIG. 20 depicts an example in which the microphone module 800 and the system therefor of a structure same as that of FIG. 19 are applied to the structure of the second form of the embodiment 2 depicted in FIG. 16. In FIG. 20, the mounting structure for the transparent liquid crystal display device is the same as that depicted in FIG. 16. The mounting structure for the microphone module 800 is the same as that depicted in FIG. 19. That is, the structure of the microphone module 800 can be applied irrespective of the mounting structure of the transparent liquid crystal display device on the glass window.

Figure 21:
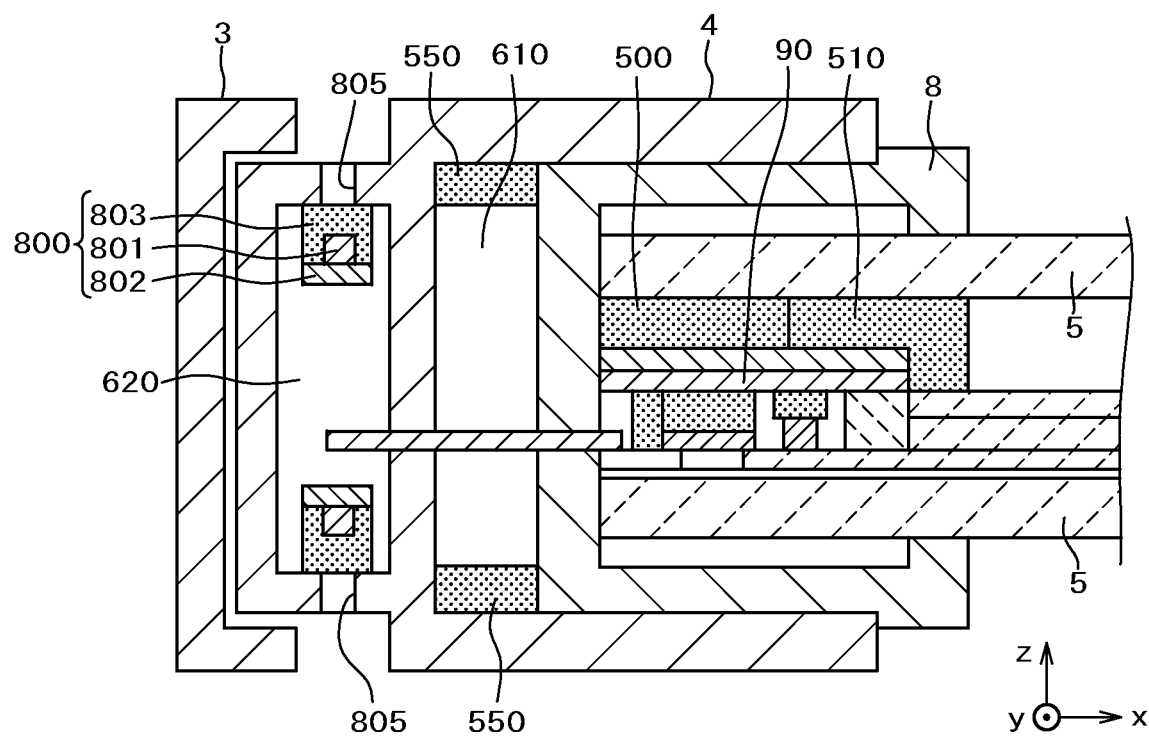
FIG. 21 is a cross sectional view depicting a third form of the embodiment 4.

Communication by voice is performed not only from the outdoor to the indoor but is sometimes performed from the indoor to the outdoor. Such communication is performed, for example, in such a case that a reply is given to a question from the outdoor. FIG. 21 is a cross sectional view depicting a configuration in which, in order to cope with such a case as just described, the microphone hole 805 is formed also in a frame on the indoor side of the screen frame 4 and the microphone module 800 is placed in the proximity of the microphone hole 805. FIG. 21 depicts the configuration corresponding to that of FIG. 19.

Figure 22:
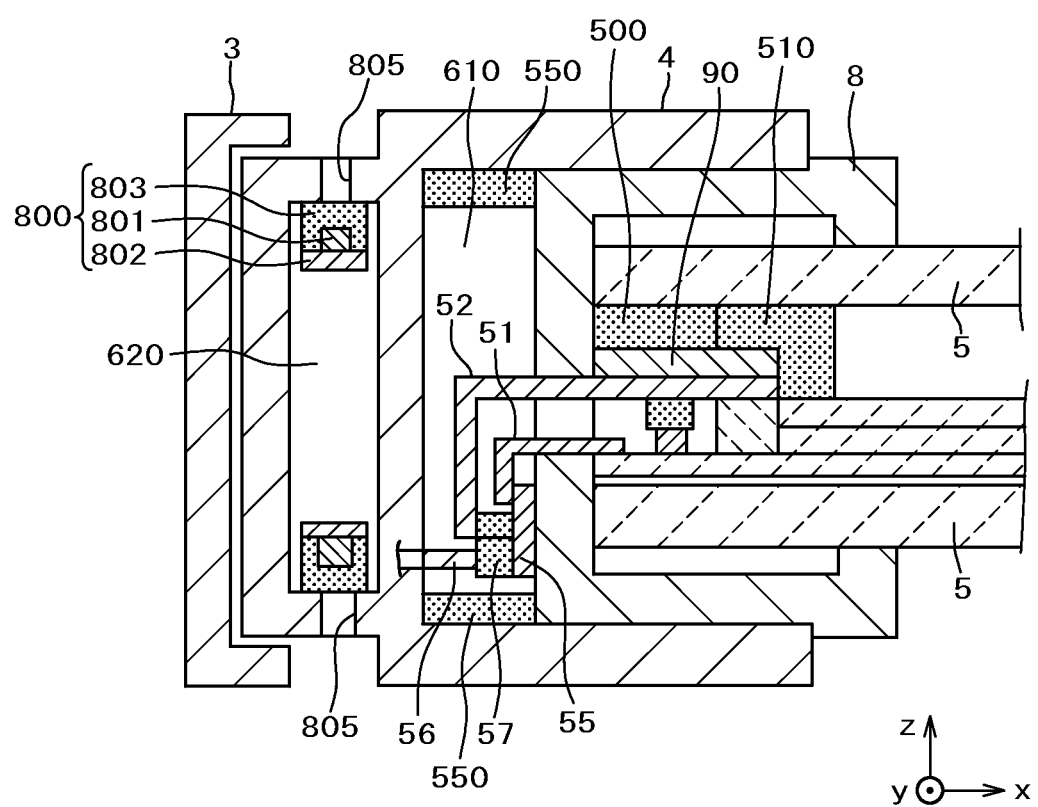
FIG. 22 is a cross sectional view depicting a fourth form of the embodiment 4.

FIG. 22 depicts an example in which the microphone module 800 is placed also on the indoor side of the screen frame 4 with respect to FIG. 20. In FIGS. 21 and 22, such a speaker of a small size as is built in a personal computer is placed in the screen frame 4 in the proximity of the microphone module. Since both the microphone module and the speaker module are placed in the screen frame 4, there is no design problem.

The embodiment 4 has been described in connection with the case in which it is applied to the embodiment 2. However, the embodiment 4 can similarly be applied also to the embodiment 1 and the embodiment 3.

While it has been described that the rubber packing 8 exists between the window glass plate 5 and the screen frame 4 or between the terminal region 30 of the transparent liquid crystal display device 1 and the screen frame 4, the rubber packing 8 is not necessarily required. For example, it is sufficient if the screen frame 4 has a function for pressing a heat conduction sheet such as the heat pipe 90 against the driver ICs 50 or the light source 40 of the transparent liquid crystal display device.

While the foregoing description is given of a case in which a transparent liquid crystal display device is placed in a window of a slide door type, the present invention can be applied also to a window not of the slide door type, a permanently closed window, and so forth. Further, the present invention can be applied also to part of a shop window, a showcase of a wine cellar or a refrigerator, and so forth.

While preferred embodiments of the present invention have been described using specific terms, such description is for illustrative purposes only, and it is to be understood that changes and variations may be made without departing from the spirit or scope of the following claims.

What is claimed is:

1. A mounting structure for a transparent liquid crystal display device that is placed in a glass window in which a periphery of a first glass plate is accommodated in and held by a first frame member, wherein
the transparent liquid crystal display device is affixed to the first glass plate by a transparent adhesive sheet,
the transparent liquid crystal display device has a display region and a terminal region,
the terminal region is accommodated in the first frame member,
a light source including a light emitting diode and a driver integrated circuit are placed in the terminal region,
a heat conduction sheet is placed between the light source and the driver integrated circuit on one hand and the first frame member on the other hand, and
the heat conduction sheet is acted upon by pressure by which the heat conduction sheet is pressed against the light source and the driver integrated circuit.

2. The mounting structure for a transparent liquid crystal display device according to claim 1, wherein a second frame member is placed between the first frame member and the terminal region, and the heat conduction sheet is acted upon by pressure by which the heat conduction sheet is pressed against the light source and the driver integrated circuit.

3. The mounting structure for a transparent liquid crystal display device according to claim 2, wherein the second frame member is formed of rubber, and the heat conduction sheet is acted upon by pressure by which the heat conduction sheet is pressed against the light source and the driver integrated circuit by springback force of the second frame member.

4. The mounting structure for a transparent liquid crystal display device according to claim 2, wherein the first frame member is formed of metal, and the second frame member and the heat conduction sheet are acted upon by pressure by which the second frame member and the heat conduction sheet are pressed against the light source and the driver integrated circuit by springback force of the first frame member.

5. The mounting structure for a transparent liquid crystal display device according to claim 1, wherein a first flexible circuit board for supplying current to the light source is placed between the light source and the driver integrated circuit, and the first flexible circuit board exists between the heat conduction sheet on one hand and the light source and the driver integrated circuit on the other hand.

6. The mounting structure for a transparent liquid crystal display device according to claim 5, wherein a spacer having a heat conduction effect is placed between the driver integrated circuit and the first flexible circuit board.

7. The mounting structure for a transparent liquid crystal display device according to claim 1, wherein the terminal region is connected to a printed circuit board through a second flexible circuit board, and the printed circuit board is bonded to the first glass plate.

8. The mounting structure for a transparent liquid crystal display device according to claim 2, wherein
the terminal region is connected to a printed circuit board by a second flexible circuit board,
the printed circuit board is placed on the second frame member, and
the second flexible circuit board extends from the terminal region, passes through a hole formed in the second frame member, and is connected to the printed circuit board.

9. The mounting structure for a transparent liquid crystal display device according to claim 1, wherein the heat conduction sheet is a heat pipe.

10. The mounting structure for a transparent liquid crystal display device according to claim 2, wherein the heat conduction sheet is in contact with the second frame member.

11. The mounting structure for a transparent liquid crystal display device according to claim 1, wherein a first hole is formed in a first side face of the first frame member, and a first microphone of a small size is placed at a portion inside the first frame member corresponding to the first hole.

12. The mounting structure for a transparent liquid crystal display device according to claim 11, wherein the first side face is a face of the first frame member on an outdoor side.

13. The mounting structure for a transparent liquid crystal display device according to claim 11, wherein a second hole is formed in a second side face of the first frame member, and a second microphone of a small size is placed at a portion inside the first frame member corresponding to the second hole.

14. The mounting structure for a transparent liquid crystal display device according to claim 1, wherein a second glass plate is placed such that a first sealing medium is interposed between the first glass plate and the second glass plate, and a first space is defined by the first glass plate, the second glass plate, and the first sealing medium.

15. The mounting structure for a transparent liquid crystal display device according to claim 14, wherein a third glass plate is placed such that a second sealing medium is interposed between the second glass plate and the third glass plate, and a second space is defined by the second glass plate, the third glass plate, and the second sealing medium.

16. A mounting structure for a transparent liquid crystal display device that is placed in a space defined between pair glass plates, the pair glass plates including a first glass plate and a second glass plate bonded to each other by a sealing medium with the space defined therebetween, such that a periphery of the pair glass plates is accommodated in and held by a first frame member, wherein
the transparent liquid crystal display device is affixed to the first glass plate by a transparent adhesive sheet,
the transparent liquid crystal display device has a display region and a terminal region,
the terminal region is accommodated in the first frame member,
a light source including a light emitting diode and a driver integrated circuit are placed in the terminal region,
a heat conduction sheet is placed between the light source and the driver integrated circuit on one hand and the first frame member on the other hand, and
the heat conduction sheet is acted upon by pressure by which the heat conduction sheet is pressed against the light source and the driver integrated circuit.

17. The mounting structure for a transparent liquid crystal display device according to claim 16, wherein the heat conduction sheet is acted upon by pressing pressure by which the heat conduction sheet is pressed against the light source and the driver integrated circuit from the first glass plate and the second glass plate.

18. The mounting structure for a transparent liquid crystal display device according to claim 17, wherein
a second frame member is placed between the first frame member and the pair glass plates, and
the pair glass plates are acted upon from opposite sides thereof by pushing pressure from the second frame member.

19. The mounting structure for a transparent liquid crystal display device according to claim 18, wherein
the first frame member is formed of metal, and the second frame member is formed of rubber, and
the pair glass plates are acted upon from the opposite sides thereof by pushing pressure from the first frame member and the second frame member.

20. A mounting structure for a transparent liquid crystal display device that is placed in a first space of triple glass plates, the triple glass plates including a first glass plate and a second glass plate bonded to each other by a first sealing medium with the first space defined therebetween and a third glass plate bonded to the second glass plate by a second sealing medium with a second space defined therebetween, the triple glass plates having a periphery accommodated in and held by a first frame member, wherein
the transparent liquid crystal display device is affixed to the first glass plate by a transparent adhesive sheet,
the transparent liquid crystal display device has a display region and a terminal region,
the terminal region is accommodated in the first frame member,
a light source including a light emitting diode and a driver integrated circuit are placed in the terminal region,
a heat conduction sheet is placed between the light source and the driver integrated circuit on one hand and the first frame member on the other hand, and
the heat conduction sheet is acted upon by pressure by which the heat conduction sheet is pressed against the light source and the driver integrated circuit.

* * * * *